United States Patent
Anheyer

(10) Patent No.: US 7,290,406 B2
(45) Date of Patent: Nov. 6, 2007

(54) I.S. MACHINE

(75) Inventor: Wolfgang Anheyer, Neuss (DE)

(73) Assignee: Emhart Glass SA, Cham (CH)

( * ) Notice: Subject to any disclaimer, the term of this patent is extended or adjusted under 35 U.S.C. 154(b) by 463 days.

(21) Appl. No.: 10/956,930

(22) Filed: Oct. 1, 2004

(65) Prior Publication Data

US 2006/0070407 A1 Apr. 6, 2006

(51) Int. Cl.
C03B 9/41 (2006.01)

(52) U.S. Cl. ............... 65/163; 65/29.1; 65/229; 65/362

(58) Field of Classification Search ........ 65/29, 65/76, 83, 102, 362, 160, 163, 29.1, 229
See application file for complete search history.

(56) References Cited

U.S. PATENT DOCUMENTS

| | | | |
|---|---|---|---|
| 4,108,623 A * | 8/1978 | Cardenas-Franco | 65/163 |
| 4,152,134 A * | 5/1979 | Dowling et al. | 65/163 |
| 4,368,062 A * | 1/1983 | Mapes et al. | 65/29.11 |
| 4,662,923 A * | 5/1987 | Vajda et al. | 65/29.15 |
| 4,679,148 A * | 7/1987 | Wood | 700/158 |
| 5,609,659 A * | 3/1997 | Peterson et al. | 65/29.11 |
| 6,622,526 B1 * | 9/2003 | Leidy et al. | 65/328 |
| 7,017,373 B2 * | 3/2006 | Bauer et al. | 65/158 |
| 7,158,112 B2 * | 1/2007 | Rosenberg et al. | 345/156 |
| 2002/0189292 A1 * | 12/2002 | Simon | 65/158 |
| 2002/0189294 A1 * | 12/2002 | Simon | 65/158 |
| 2004/0051704 A1 * | 3/2004 | Goulthorpe | 345/204 |

FOREIGN PATENT DOCUMENTS

| | | | |
|---|---|---|---|
| EP | 0488136 | 6/1992 | |
| GB | 2159813 | 12/1985 | |
| WO | 9422776 | 10/1994 | |
| WO | WO 9422776 | * 10/1994 | 65/160 |

* cited by examiner

Primary Examiner—Steven P. Griffin
Assistant Examiner—DeMaris R. Wilson
(74) Attorney, Agent, or Firm—Spencer T. Smith

(57) ABSTRACT

An I.S. Machine is disclosed which includes a structure displaceable from a start location to an end location and a motor for displacing that structure. A control controls the operation of the motor to displace the structure and the speed of displacement can be varied by changing inputs to the control. A fixed period of time from a datum to the ideal time when the structure will be displaced to its end location is set and compared with an actual period and a selected input to the control is provided for changing the speed of the structure to reduce the difference.

5 Claims, 2 Drawing Sheets

I.S. MACHINE

The present invention relates to I.S. (Individual section) machine which form bottles from moten gobs of glass.

BACKGROUND OF THE INVENTION

In the first process step, a parison is formed in a blank mold by vertically advancing a plunger into the blank mold to fill the volume between the blank mold and the plunger with the molten glass. When the parison is formed (the volume is filled) further advancement of the plunger will tend to open the mold and this is undesirable. For a pneumatic plunger mechanism, the plunger-up-pressure has to be adjusted manually from time to time in order to ensure proper parison forming, due to changes in glass viscosity and friction in the plunger mechanism, positioner and guide ring. With an electronic plunger mechanism, the force controller of the servo-electric-plunger mechanism will operate with a selected force demand value or curve until manually adjusted by the operator.

In a conventional plunger mechanism, vertical displacement begins at a "down" position. The first segment of the displacement of the plunger is vertically upwardly from the down position to a "load" position where it will have slightly entered the blank mold. When a molten gob is then dropped into the mold, some of the molten glass will flow downwardly past the top of the plunger thereby beginning the process of forming the finish (threaded portion) of the bottle. The second segment of displacement is rapid vertical displacement to a location where "finish press" is to begin. At this finish press position, a press force will be applied until the parison has been formed whereupon the plunger has reached the "parison formation point" whereat all air has been removed from the mold. Following this, as pressure continues to be applied, the plunger rises slowly as the blow parison cools and shrinks. At some time following the parison formation point, the plunger reaches the up position. It will then be displaced vertically downwardly to the "down" position thereby allowing the parison to be transferred to the blow station where it will be blown into a bottle.

OBJECT OF THE INVENTION

It is an object of the present invention to provide a controller for the plunger mechanism in an I.S. machine which will automatically adjust the feed program in response to changes in glass viscosity and friction.

Other objects and advantages of the present invention will become apparent from the following portion of this specification and from the accompanying drawings which illustrate a presently preferred embodiment incorporating the principles of the invention.

BRIEF DESCRIPTION OF THE PREFERRED EMBODIMENT

Figure 1:
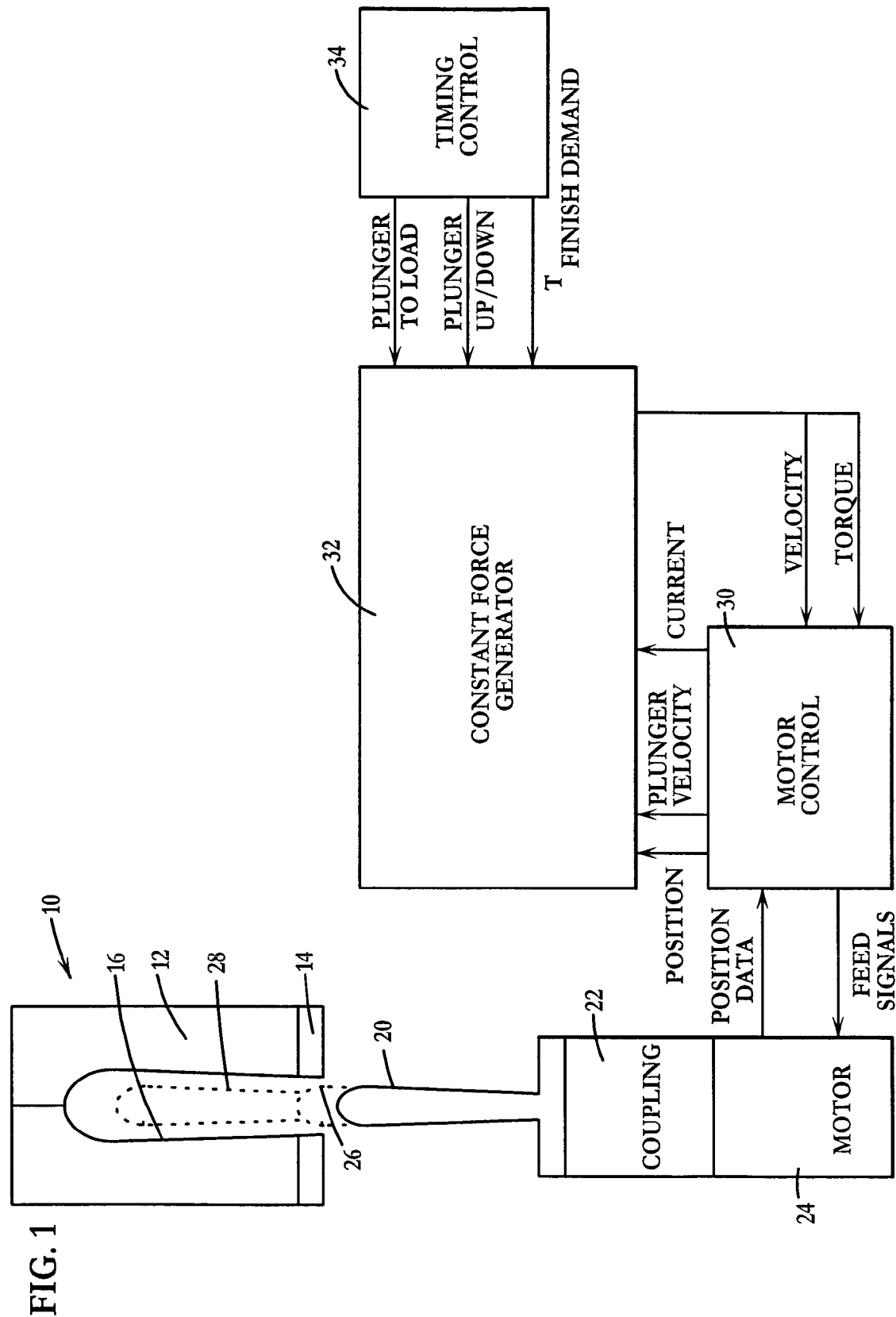
FIG. 1 is a schematic showing of a blank station of an I.S. machine, made in accordance with the teachings of the present invention.

An I.S. machine has a blank station 10 which has a pair of blank molds 12 and a pair of neck ring molds 14 which are displaceable between open and closed positions. When closed, as illustrated, they define an interior "parison" mold surface 16. A plunger 20 which is coupled 22 to a servo motor 24 is selectively vertically displaceable from the shown down position up to a "load" position 26. When at this position, a gob of molten glass will be dropped into the open top of the blank mold. The mold will then be closed and the plunger will be advanced vertically upwardly to the fully up position 28. During this movement, which forms the parison, the plunger is first rapidly advanced for a predefined time and then the plunger begins "finish press" wherein a constant force is applied to press the plunger upwardly into the molten glass. After the parison is fully formed (the parison formation point), the plunger will be returned to the down position.

As can be seen from FIG. 1, a Motor Control 30, supplies Feed Signals to the motor 24 and receives Positional Data from the motor. The feed signals define the rapid feed and constant press force segments of the plungers displacement from the load position until plunger down. The Motor Control supplies Position, Plunger Velocity and Current data to a Constant Force Generator 32 and the I.S. machine Timing Control 34 supplies timing signals such as Plunger Up/Down and Plunger To Load. While this is called a Constant Force Generator, "force" is used to conote some drive that will result in the displacement of the plunger. The Timing Control also supplies the Constant Force Generator with a Tfinish Demand signal which is the desired time between the plunger reaching the parison formation point and the plunger down signal.

Figure 2:
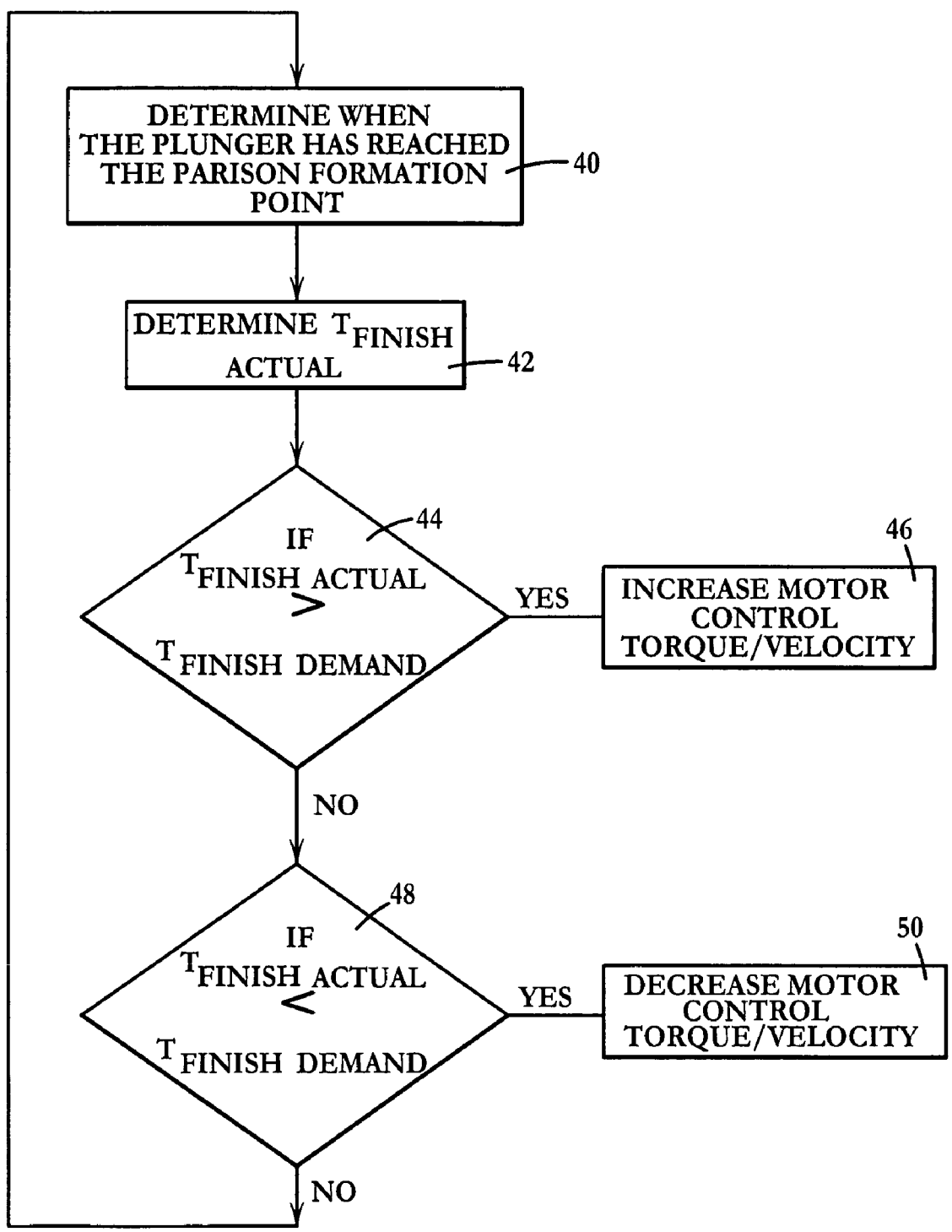
FIG. 2 is a logic diagram illustrating the operation of the Constant Force Generator illustrated in FIG. 1.

Referring to FIG. 2, which shows the logic diagram for the Constant Force Generator, the Constant Force Generator first determines, from the data supplied by the Motor Control, when the plunger has reached the parison formation point (the point when the parison has been completely formed) 40. The Constant Force Generator will then Determine Tfinish 42, which is the time between the time of the parison formation point and plunger down, and compare this delta time to the ideal Tfinish demand. If Tfinish Actual>Tfinish Demand 44, the Constant Force Generator will instruct the Motor Control (see FIG. 1) to Increase Motor Control Torque/Velocity 46. If Tfinish Actual<Tfinish Demand 48, the Constant Force Generator will instruct the Motor Control to Decrease Motor Control Torque/Velocity 50.

In a pneumatic system where a plunger is advanced under air pressure, the motor would be the pneumatic cylinder and the motor control could be either an electronic pressure regulator/control, or a servo control valve/control, or the controlled timing for multiple plunger-up events, or valves resulting in a controlled pressure curve.

This invention recognizes the importance of glass forming events occurring during a desired time interval and varying the process to achieve that objective.

The invention claimed is:

1. An I.S. machine including
a structure displaceable from a start location to an up position,
an actuator for displacing said structure, a control for controlling the operation of the actuator to displace the structure, said control including means responsive to a selected input for increasing or decreasing the speed of the displacement, determining means for determining the actual time for the structure to be displaced from the start location to its up position, defining means for defining an ideal time for the structure to be displaced from the start location to its up position, comparison means for comparing the ideal time with the actual time and for supplying a selected input to said control for changing the speed of the structure to reduce the difference.

2. An I.S. machine according to claim 1, wherein said structure is a plunger for a blank mold.

3. An I.S. machine according to claim 2, wherein said actuator is a servomotor and said control for controlling the operation of the actuator is a servo motor control.

4. An I.S. machine according to claim 3, wherein said input is velocity.

5. An I.S. machine according to claim 3, wherein said input is torque.

* * * * *